Aug. 1, 1961     J. W. GRATIAN ET AL     2,994,837
ADJUSTABLE DOUBLE PULSE GENERATOR
Filed Dec. 16, 1948     2 Sheets-Sheet 1

WITNESSES:

INVENTORS:
Joseph W. Gratian
Anne C. Gratian
BY
Roland A. Anderson
Attorney

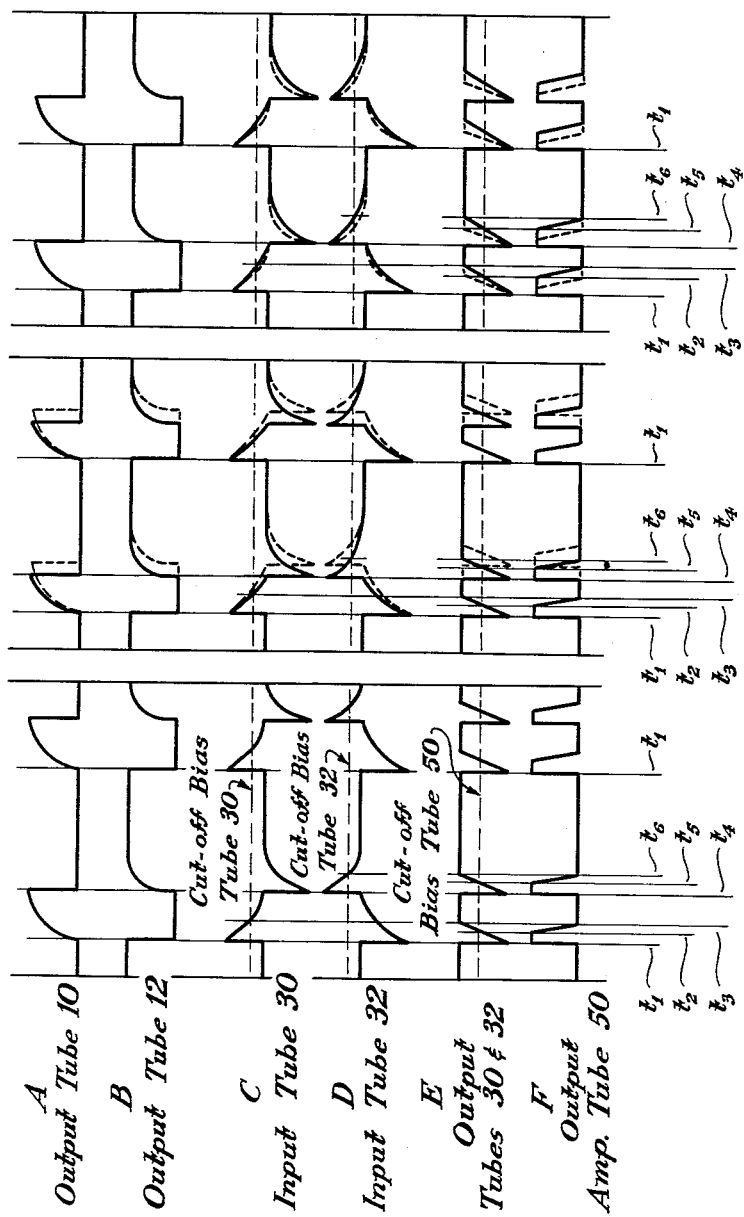

United States Patent Office 2,994,837
Patented Aug. 1, 1961

2,994,837
ADJUSTABLE DOUBLE PULSE GENERATOR
Joseph W. Gratian and Anne C. Gratian, Rochester, N.Y., assignors to the United States of America as represented by the United States Atomic Energy Commission
Filed Dec. 16, 1948, Ser. No. 65,698
2 Claims. (Cl. 331—60)

This invention relates to pulse generators and, more particularly, to improved apparatus for the generation of pulses of controllable width and controllable sequential spacing.

Electronic systems such as used for instance for radio detecting and ranging, pulse modulated communication, and television transmitting utilizes voltage pulses for activating or de-activating portions of apparatus thereof.

In such systems, it is frequently desirable that the pulse width be adjustable to a selected value. For instance, in a ranging device, it is necessary that the transmitter be activated for short intervals for ranging at short distances, and it is desirable that the activations be longer to permit additional power to be radiated for ranging at longer distances.

It is also desirable that the interval between the activating or de-activating pulses be adjustable. In a ranging device for instance, the interval between a radiation and listening period must be longer for long ranging distances than for short ranging distances.

More particularly, there are occasions which require a sequence of generated pulses in which the pulses are sequentially spaced from each other alternately by short and long intervals.

It follows that a pulse generator which is simple and so arranged that pulse width, pulse spacing and repetition rate can be adjusted is desirable for various applications.

It is, therefore, an object of this invention to provide a simple device for generating potential pulses.

It is another object of this invention to provide a pulse generator of unidirectional waveforms which is adjustable as to pulse duration.

It is still another object to provide a pulse generator capable of generating pulses in sequence and being adjustable as to the interval between pulses.

Another object is to provide a pulse generator for generating pulses with alternate short and long intervening intervals.

Other objects of the invention will become apparent from the following description taken in conjunction with the accompanying drawings in which:

FIGURE 3 is a series of curves showing pulses created by different parts of the pulse generator in order to show the steps in the evolution thereof to the desired form.

FIGURE 4 is a series of curves of pulses in different parts of the pulse generator showing how variation in pulse spacing is obtained.

FIGURE 5 is a series of curves of pulses in different parts of the pulse generator showing how variation in pulse width is obtained.

Figure 1:
FIGURE 1 is a chart showing one form of pulse sequence which it is desired to produce.

Referring to the drawings, FIGURE 1, a series of pulses are shown of the type particularly useful in radio ranging devices. It is desirable to provide in the generator for creating such pulses, means for varying the pulse width and the pulse spacing.

Figure 2:
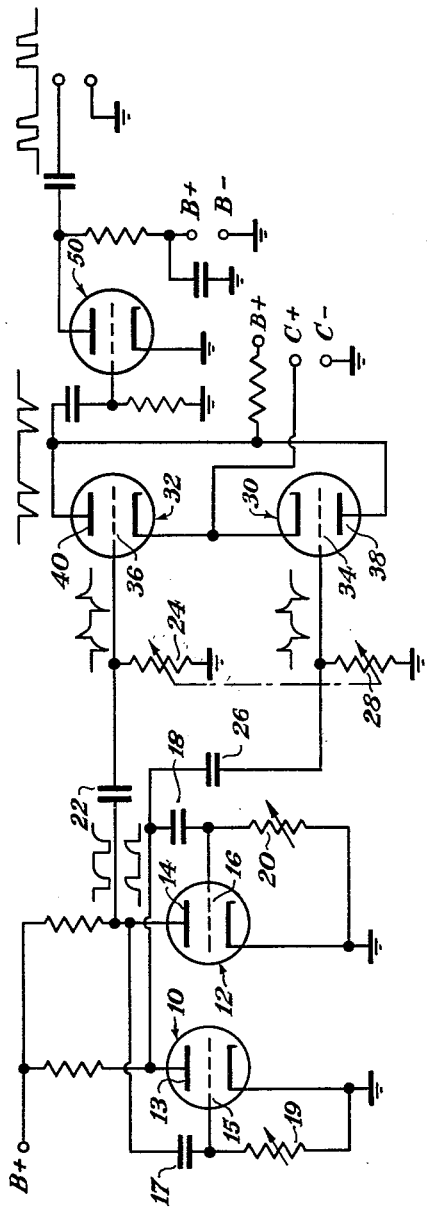
FIGURE 2 is a schematic illustration of the pulse generator.

Referring to FIGURE 2, a preferred embodiment of apparatus for accomplishing the objectives is shown. The basic source for generating pulses is a multi-vibrator comprising two tubes 10 and 12 in a conventional cross-coupled grid anode circuit. The cross-coupling networks comprise condenser 17 and grid resistor 19; and condenser 18 and grid resistor 20. It will presently become apparent that the time constant of condenser 17 and grid resistor 19 determines one of the spacings between pulses and the time constant of condenser 18 and resistor 20 determines the other spacing between pulses. To the end that the time constants of these circuits and, therefore, the respective spacings between pulses can be adjusted at will, resistors 19 and 20 are adjustable.

The pulses created by the multi-vibrator appearing at the anodes 13 and 14 are impressed on differentiating circuits comprising condenser 26 and resistor 28, and condenser 22 and resistor 24 respectively. The sharpened signals derived from the differentiating circuits are impressed on the grids 34 and 36 respectively of a pair of triodes 30 and 32. The anodes 38 and 40 of tubes 30 and 32 are connected together and the cathodes are likewise connected together. Each of the tubes is provided with a cut-off bias by means of a positive potential source C+ connected to the cathodes. The differentiated input pulses are therefore combined in tubes 30 and 32 and appear with negative polarity in sequence in the common anode circuit. The sequential negative pulses are impressed on amplifier tube 50 which is biassed in the neighborhood of zero so that the impressed pulses drive the tube beyond cut-off thereby clipping the pulses created in the output thereof. The output pulses, therefore, are rectangular positive pulses of the desired form.

For a detailed description of the manner of operation of the pulse generator in FIGURE 2, reference is now made to FIGURE 3.

The pulses generated at the anodes of tubes 10 and 12 respectively are shown by FIGURE 3, curves A and B. These pulses are of opposite polarity. The pulses derived from anode 13 of tube 10 are differentiated in the network comprising condenser 26 and variable resistor 28 and are sharpened as shown in curve C. Likewise, the pulses appearing on the anode 14 of tube 12 are differentiated by condenser 22 and resistor 24 and are sharpened as shown in curve D. The differentiated pulses are applied respectively to the grids 34 and 36 of the mixer tubes 30 and 32. Due to the fact that the mixer tubes are provided with a cut-off bias, as shown by the dotted lines, only that portion of the differentiated pulses impressed thereon which exceeds the bias appears in the common anode circuit. These combined pulses appear as shown in curve E, and are impressed on amplifier tube 50. The amplifier tube 50 is initially provided with a bias such that the negative excursions of the pulses impressed thereon drive the tube beyond cut-off thereby presenting in the anode circuit clipped or square-topped pulses as shown in curve F.

It is to be noticed that the original pulses generated by the multi-vibrator, and shown in curves A and B, had a width equal to $t_4 - t_1$. These pulses were differentiated thereby creating two positive and two negative pulses shown in curves C and D, and having a spacing equal to $t_4 - t_1$.

The widths of the multi-vibrator pulses are determined by the shorter of the two time constants in the multi-vibrator. It follows that the spacing between the two positive and the two negative differentiated pulses likewise is determined by the shorter of the two time constants in the multi-vibrator. As pointed out previously, the pulses derived by differentiating the multi-vibrator pulses are impressed on the independent grids 34 and 36 in the mixer stage. Since these grids are biassed to cut-off, the mixer stage passes only the positive portions of the input pulses. That is, mixer grid 34 causes conduction only during $t_1$ to $t_3$ and mixer grid 36 causes conduction only during $t/4$ to $t/6$. By this means, the base width of the pulses, as shown in curve E, in the mixer stage output is determined.

The pulses derived from the mixer stage are impressed on the grid of amplifier tube 50 which, as stated previously, is operated substantially at zero bias. The negative excursions of the input pulses which extend from $t_1$ to $t_2$ and from $t_4$ to $t_5$ are clipped at the cut-off value shown by the dotted line thereby creating in the output of amplifier tube 50, the square-topped pulses shown in curve F.

The versatility of the circuit thus far described lies in the fact that both pulse width and pulse spacing may be easily varied without any appreciable change in the amplitude or slopes of the sides of the output pulses. Hence, in the application of the device to ranging for instance, the ranging depth and average range are readily adjusted.

The manner in which pulse spacing is controlled is now explained with reference to FIGURE 4, curves A through F.

It is assumed for the purposes of explanation that the width of the pulses in curves A and B is determined mainly by the time constant of resistor 19 and capacitor 17 connected in the grid circuit of tube 10. It is also assumed that the value of resistor 19 is adjustable and is decreased, thereby shortening the time constant of the product of resistor 19 and capacitor 17. The shortened pulses appearing at the anodes of tubes 10 and 12 are shown in FIGURE 4, curves A and B. The original length of the pulses, under the conditions described with reference to FIGURE 3, is shown by dotted lines to facilitate comparison therewith.

It is to be noted at this point that if the short time constant of the multi-vibrator is shortened, the repetition frequency is increased. This effect is eliminated by a corresponding lengthening of the long time constant. To this end, resistor 20 is increased in value slightly. It is apparent that resistors 19 and 20 may be mechanically coupled in an obvious manner so that the sum of the short and long time constants is a constant. Conversely, the resistors may be coupled in any obvious manner so as to increase the repetition rate as the short pulse is shortened, if desired.

The shortened pulses are differentiated and appear as shown in FIGURE 4, curves C and D. The two positive and two negative pulses obtained from the differentiation now have a shorter time spacing as is seen by comparison with the original condition shown by the dotted lines. The differentiated pulses appearing in the output of tubes 30 and 32 appear as shown in FIGURE 4, curve E. The double pulses so obtained have the same spacing in time as the positive pulses impressed on the grids of tubes 30 and 32. As noted previously, the input pulses impressed on tube 32 follow more closely upon the input pulses applied to tube 30 as shown by comparison with the occurrence of the pulses under the conditions of FIGURE 3 as shown by the dotted lines.

It follows that the double pulses appearing in the common anode circuit of tubes 30 and 32 are also spaced closely, that is, by a shorter intervening time interval than under the conditions of FIGURE 3. The pulses appearing in the common anode circuit of tubes 30 and 32 are impressed on the grid of amplifier tube 50 in the manner previously described. Since the bias on tube 50 is such that the negative excursions of the double pulses pass through the cut-off point shown by the dotted lines in curve E, the pulses are clipped, and therefore appear in the output circuit of tube 50 with the square tops as shown in curve F. It is noted at this point that the width of the square tops of the pulses extends between the time, $t_2-t_1$, and this is determined by the inter-section of the value of the input pulses with the grid potential cut-off value. The width of the base of the output pulses is equal substantially to the width of the base of the input pulses.

From the foregoing, it is seen that the double pulses have been moved together by the expedient of a decrease in the value of a grid resistor and, it is apparent, that the pulses may be moved apart by increasing the value of the grid resistor.

The output pulse width may be varied by the simple expedient of varying the amount of differentiation of the pulses derived from the multi-vibrator before impression on the mixing stage.

Referring again to FIGURE 2, the differentiating circuits comprising condenser 22 and resistor 24 in the channel of mixing tube 32, and condenser 26 and resistor 28 in the channel to tube 30, are shown as adjustable by the variation of resistors 24 and 28 respectively. In order that the amount of differentiation in each channel will be equal, it is preferred to gang the controllable element in the resistors 24 and 28.

Referring now to FIGURE 5, it is assumed for purposes of explanation that resistors 24 and 28 have been equally increased in value thereby reducing the amount of differentiation. The pulses appearing at the anodes of the multi-vibrator tubes are shown in curves A and B and are identical with the pulses obtained under the condition of FIGURE 3, curves A and B. These pulses are differentiated to a lesser extent than that shown in FIGURE 3 with the result that it takes longer for the positive pulses to decrease to the level of cut-off bias of the tubes 30 and 32, and therefore the pulses are lengthened. These lengthened pulses are impressed on the input of tubes 30 and 32 and appear in the output thereof as pairs of lengthened pulses, although with the original period between pulses. These pulses are impressed on output tube 50 and are clipped in the manner above described.

Since the input pulses impressed on tube 50 are wider at the base thereof, they are also wider at the point at which they are cut off by the cut-off value of the grid potential of tube 50. It follows that the output pulses have a longer flat-top, $t_1$ to $t_2$, and a longer base, $t_1$ to $t_3$, as shown in FIGURE 5, curve F. The two pulses in each pair of pulses are similar, that is, $t_1$ to $t_2$ is equal to $t_4$ to $t_5$, and $t_1$ to $t_3$ is equal to $t_4$ to $t_6$. It should be noted at this point that other things being equal, the interval between broadened pulses, that is, $t_1$ to $t_4$ of FIGURE 5 is equal to the interval $t_1$ to $t_4$ of the original pulses shown in FIGURE 3.

It follows from the foregoing that generated pulse width may be controlled by the simple expedient of providing means for controlling the amount of differentiation applied to the output pulses of the multivibrator. It also follows that adjustability in pulse spacing and pulse width is available independently, and with the additional provision that the product of the long time constant controlling condenser 18 and resistor 20 be made adjustable, the repetition rate at which the double pulses occur can also be controlled.

It will be understood by this invention, a preferred embodiment of which is above described, that a pulse generator is provided which has extremely flexible characteristics for the production of substantially rectangular pulses. As various possible embodiments might be made of the mechanical features of the above invention, and as they are herein described might be varied in various parts, all without departing from the scope of the invention, it is to be understood that all matter hereinabove set forth, or shown in the accompanying drawings is to be interpreted as illustrative and not in a limiting sense.

What is claimed is:

1. In a pulse generator comprising a free running multivibrator oscillator of the cross-coupled grid anode type, a differentiating circuit comprising a serially connected condenser and an adjustable resistor connected by the free terminal of the condenser to each of said multivibrator anodes in series with the inter-electrode space thereof, whereby sharpened pulses of opposite polarity corresponding to the leading and trailing edges of the pulses generated by the multi-vibrator at the respective anode appear at the junction of the condenser and resistor in each differentiating circuit, a pair of tubes each having at least a cathode, a grid and an anode, each tube having its grid connected to the junction of the condenser and resistor of the respective one of the differentiating circuits, and being provided with a negative bias whereby a portion of the positive sharpened input pulses are inverted and reproduced at the anode, the anodes of said tubes being connected to form a common channel whereby said inverted portions of the positive input pulses appear as negative pulses in sequence in said common channel, an output tube having at least a cathode, a grid and an anode, and having a bias such that the amplitude of the sequentially combined input negative pulses exceeds the cut-off value, and means for impressing the negative pulses on the grid of the output tube whereby substantially rectangular positive pulses of adjustable width are produced at the anode of the output tube.

2. In a pulse generator, an asymmetrical free running multi-vibrator adapted to produce simultaneously pairs of pulses of opposite polarity with a pause between pulses of longer duration than the length of said pulses, means in said multi-vibrator for varying the duration of the said pulses, means in said multivibrator for varying the duration of the pause between said pulses, a first channel including means for differentiating the pulses of a first polarity and a second channel including means for differentiating the pulses of opposite polarity, means in each channel for conducting a portion exceeding a selected value of the positive components of the differentiated pulses, means for inverting and combining in a common channel the portions exceeding the said selected value of the positive components of the differentiated pulses, and means for inverting and clipping the combined negative pulses whereby substantially rectangular pulses are produced in sequence with a first time spacing determined by the adjustment of the means in said multi-vibrator for varying the duration of the pulses and with a second time spacing equal substantially to the pause between multivibrator pulses, means for simultaneously adjusting the pulse duration adjusting means and the means for varying the pause between pulses so that the repetition rate is a function of the pulse duration.

References Cited in the file of this patent

UNITED STATES PATENTS

| | | |
|---|---|---|
| 2,193,868 | Geiger | Mar. 19, 1940 |
| 2,207,048 | Campbell | July 9, 1940 |
| 2,226,459 | Bingley | Dec. 24, 1940 |
| 2,452,459 | Cleeton | Nov. 2, 1948 |